United States Patent [19]

Lachance

[11] Patent Number: 4,716,850
[45] Date of Patent: Jan. 5, 1988

[54] FLOATATION ASSEMBLY FOR OFF-ROAD VEHICLE

[76] Inventor: André Lachance, 1140 des Pivoines Street, Alma, Canada, G8B 7E6

[21] Appl. No.: 947,561

[22] Filed: Dec. 24, 1986

[51] Int. Cl.$^4$ .............................................. B63B 35/86
[52] U.S. Cl. ...................................... 114/270; 440/11
[58] Field of Search .................... 440/11, 12; 114/270, 114/344; 14/2.6

[56] References Cited

U.S. PATENT DOCUMENTS

| 1,034,278 | 7/1912 | Munsen | 114/270 |
| 3,208,087 | 9/1965 | Edwards | 14/2.6 |

Primary Examiner—Sherman D. Basinger

[57] ABSTRACT

The floatation assembly includes a pair of inverted U-shaped rails, the legs of which are adapted to be secured to the front and to the rear of the vehicle frame, with the bight portion of the rails extending substantially horizontally over a vehicle driver seated in the off-road vehicle. A front and a rear buoyant member is connected to the rails and shiftable between an operative and inoperative position. In their operative position, the two buoyant members extend forwardly and rearwardly of the vehicle in alignment therewith to render the same water-borne. In the inoperative position, the front buoyant member rests in inverted position on the bight portion of the rails, while the rear buoyant member is folded upwardly against the rear legs of the rails. When in operative position, the two buoyant members can be vertically adjusted with respect to the vehicle, in cordance with the weight of the vehicle itself and of its load. The two buoyant members are preferably in the shape of two water-craft sections and can be detached from the rails and directly interconnected to form a water-craft.

6 Claims, 8 Drawing Figures

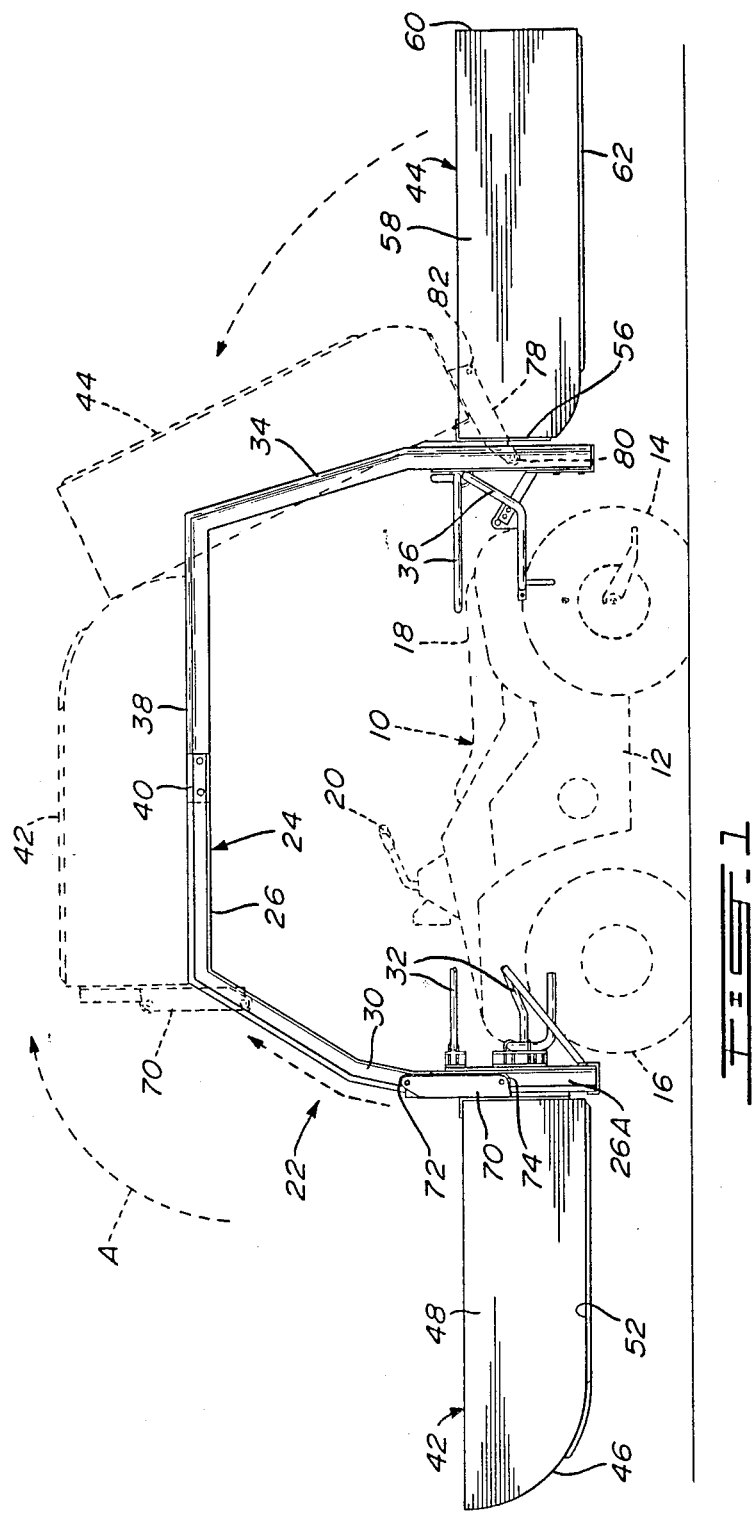

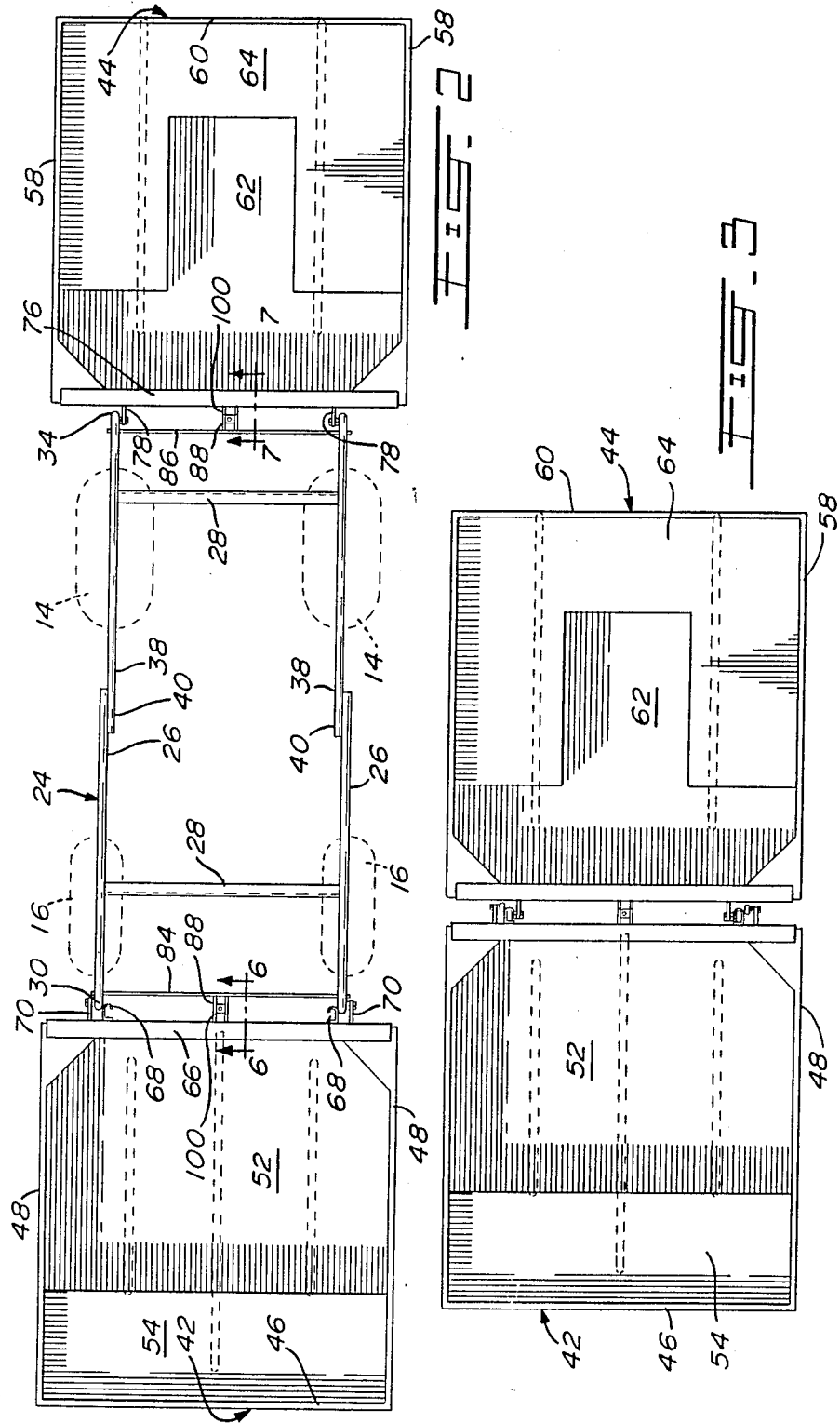

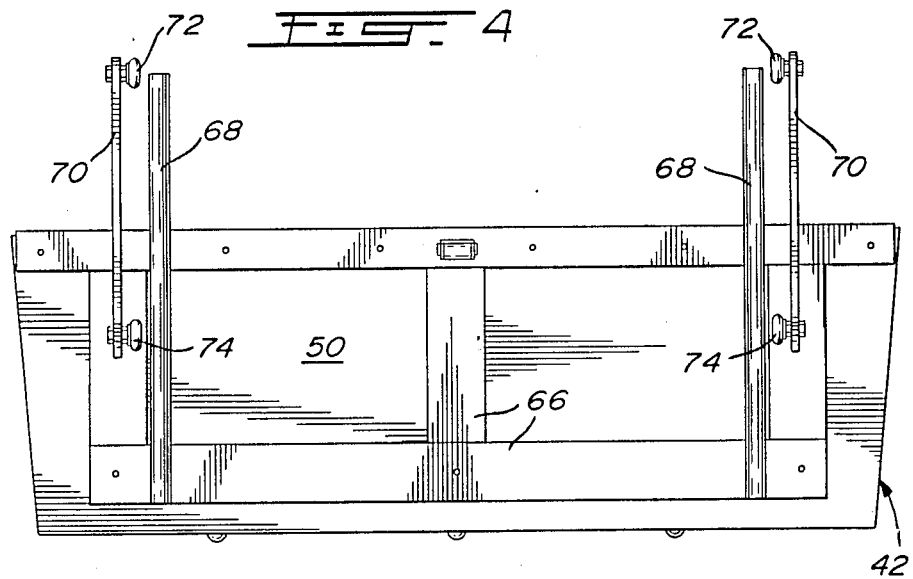
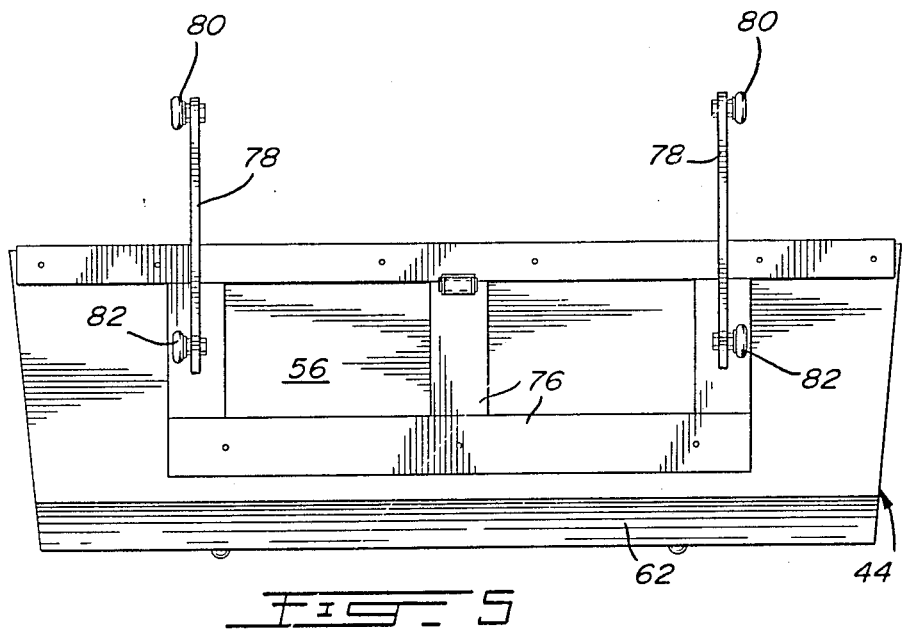

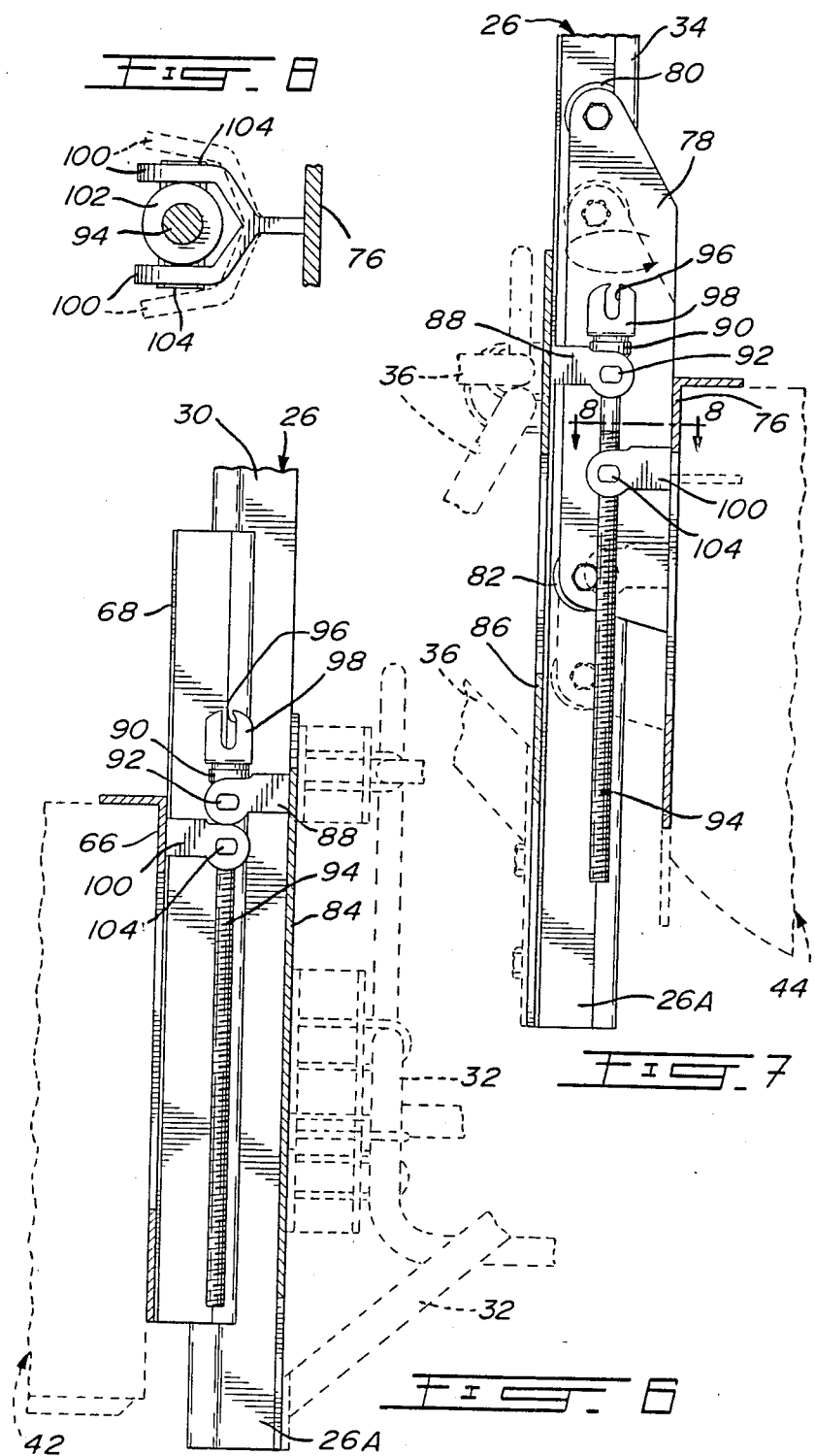

FLOATATION ASSEMBLY FOR OFF-ROAD VEHICLE

FIELD OF THE INVENTION

This invention relates to an attachment for all-terrain vehicles and, more specifically, to a floatation assembly connected to such vehicles for making them amphibious.

BACKGROUND OF THE INVENTION

Pontoons have been proposed for attachment to the sides of an all-terrain vehicle to permit the same to be used in water. These pontoons are provided with vertical adjustment means operable in unison to lower the pontoons in operative position and to raise the same to an inoperative position: see U.S. Pat. No. 4,494,937 issued in 1985. These laterally-extending pontoons hamper road maneuverability, especially when the vehicle travels in woods, and the pontoons are prone to rapid wear and breakage, since they may strike big rocks, trees and the like. Once punctured, the can no longer be used as buoyant members. Another disadvantage of such a system is that the flotation level of each pontoon cannot be adjusted independently of the other, whereby the variable location of loads on the vehicle cannot be compensated for.

OBJECTS OF THE INVENTION

The general object of the invention is to provide a flotation assembly for an all-terrain vehicle, in order to permit the same to travel on water, said floatation assembly shiftable on the vehicle to an inoperative position, taking a minimum of additional space widthwise and lengthwise of the vehicle, so that the latter can travel in woods and narrow passages without substantially more obstruction than a vehicle without such floatation assembly.

Another object of the present invention is to provide front and rear flotation assemblies for an all-terrain vehicle provided with means to individually adjust the flotation level of each assembly.

Another object of the present invention is to provide buoyant members of the character described, which, in inoperative position, serve as a weather shelter for the vehicle passengers.

Another object of the present invention is to provide flotation assemblies in the form of water-craft sections, which can be disconnected from the vehicle and directly coupled to each other to form a sturdy and safe water-craft or boat.

SUMMARY OF THE INVENTION

The floatation assembly of the invention comprises an open frame, of inverted U-shape, defining front and rear legs and a bight portion, said front and rear legs adapted to be secured to the front and rear of the vehicle frame, with the bight portion extending above the vehicle driver seated in the vehicle. Front and back buoyant members are connected to said open frame and are shiftable relative thereto between an operative position to permit the vehicle to be water-borne, and inoperative position to permit the vehicle vehicle to travel on the ground, said buoyant members, when in operative position, extending forwardly and rearwardly of the vehicle, respectively, at the level of the same, and when in inoperative position, said front section is srpported on said bight portion and said section is pivoted upwardly against the rear legs. Preferably, said open frame includes a pair of rails, of C-shaped crosssection, transversely spaced with respect to said vehicle and each buoyant member is provided with two pairs of vertically-spaced hook members, preferably idle rollers, engaging the rails to be maintained in their operative position, the lower pair of hook members being releasable from the rails to permit upward pivoting of the buoyant members relative to the rails about the upper hook members of the pairs, whereby the front buoyant member can be pivoted upwardly and shifted along the rails to an inverted position resting on the bight portions of the rails, while the rear buoyant member can be pivoted upwardly about its upper hook members to take a position resting against the rear legs of the rails. Preferably, each buoyant member is provided with its own independently-operable level adjustment means. Preferably, the buoyant members are in the form of water-craft sections which can be disconnected from the rails and directly coupled to each other to form a full watercraft.

BRIEF DESCRIPTION F THE DRAWINGS

FIG. 1 is a side elevation of the floatation assembly of the invention as mounted on an all-terrain vehicle, shown in dotted lines, with the buoyant members in operative position, said figure also showing the inoperative road-travelling position of the buoyant members in dotted lines;

FIG. 2 is a top plan view of the assembly in operative position, only the four wheels of the vehicle being shown in dotted lines.

FIG. 3 is a top plan view of the bow and stern buoyant members shown coupled together;

FIGS. 4 and 5 are elevations of the inner end wall of the bow and stern buoyant members, respectively;

FIGS. 6 and 7 are partially sectional elevations taken along lines 6—6 and 7—7 of FIG. 2, respectively and FIG. 8 is a cross-section taken along line 8—8 of FIG. 7.

DETAILED DESCRIPTION OF THE PREFERRED EMBODIMENT OF THE INVENTION

Referring to FIG. 1, there is shown an all-terrain vehicle 10, which includes a vehicle frame 12, a pair of rear-driving wheels 14, a pair of front steerable wheels 16, and a seat 18 on which a driver and possibly another passenger can sit, the driver grasping handlebar 20.

Referring to FIGS. 1 and 2, the floatation assembly is generally indicated at 22. It includes an open frame 24, of inverted U-shape, consisting of a pair of transversely-spaced rails 26 interconnected, as shown in FIG. 2, by transverse braces 28. Each rail 26 forms a front leg 30 secured to the front of the vehicle frame 12 by means of suitable brackets 32, and their rear legs 34 secured to the back of the vehicle frame 12 by rear brackets 36. The rails 26 further include a horizontally-extending bight portion 38 interconnecting the front and back legs. Each rail 26 is preferably made of two sections interconnected at 40 in the middle of their bight portions 38.

The flotation assembly 22 further includes a bow buoyant member 42 and stern buoyant member 44. Each buoyant member is preferably in the form of a half a water-craft section, being open at the top to receive passengers. Member 42 has a generally rectangular shape, when seen in top plan view and defining a curved front wall 46, flat side walls 48, a flat rear wall 50, and a bottom wall 52. A seat 54 may be provided adjacent front wall 46. Similarly, the stern buoyant member 44 has a front wall 56, side walls 58, a rear wall 60, and a bottom wall 62 and is preferably provided with a U-shape rear seat 64.

As shown in FIG. 4, a reinforcing flat metallic frame 66 is secured against the exterior face of the rear wall 50 of the bow water-craft section 42. A pair of transversely-spaced upright rail sections 68 are secured to the flat frame 66 at equal distance from the centerline of the water-craft section 42. each other. Externally of each rail section 68, there As shown in FIG. 2, these rail sections 68 are of C-shaped cross-section, with the open part of the C facing is secured to flat frame 66 a flat elongated plate 70 carrying at each end an upper idle roller 72 and a lower idle roller 74. These rollers form hook members engageable with rails 26. These rails 26 are also of C-shaped crosssection and have the same cross-sectional size as the rail sections 68. The rollers 72 and 74 are inwardly directed, so as to face each other and are engagable within the rails 26 at the front part of the vehicle. When the upper and lower rollers 72, 74 are all engaged with the front vertical portion of the legs 30, the buoyant water-craft section is rigidly maintained in horizontal position. Since the bottom ends 26A (see FIG. 6) of the rails 26 are completely open, the lower rollers 74 can be released from said rails when the water-craft is sufficiently lowered with respect to the rails, and then the water-craft 42 can be upwardly pivoted with respect to the rails 26 about their upper pair of rollers 72, in accordance with arrow A of FIG. 1. Thus, the front water-craft 42 can be shifted upwardly with its upper roller 72 still in engagement with the rails 26 and then pivoted completely to rest in inverted position on the bight portion 38 of the rails 26, as shown in dotted line in FIG. 1.

The front wall 46 of the stern buoyant member 44 is similarly provided with a flat reinforcing frame 76 to which are secured upright elongated plates 78, equally distant from the centerline of the stern buoyant member 44. Each plate 78 carries an upper roller 80 and a lower roller 82. The rollers carried by one plate face away from the rollers carried by the other plate 78. Rollers 80, 82 are in rolling engagement with the rear legs 34 of the rails 26. These rail legs are also fully open at their lower end, so that the lower rollers 82 can be released from the rails 26, such that the rear stern buoyant member 44 can be upwardly pivoted to an inoperative position, as shown in dotted lines in FIG. 1, the stern buoyant member 44 pivoting relative to said rails about its upper pair of rollers 80. When the two pairs of rollers are engaged in the vertical portion of the rear legs 34, the stern buoyant member 44 is maintained in horizontal position.

It should be noted that both buoyant members 42, 44 can be disconnected from the rails 26 by removing the rollers 72, 74, 80, 82 from the bottom ends of the rails, so that the two water-craft sections be directly interconnected as shown in FIG. 3, with the rollers 80, 82 of the stern water-craft section rollably engageable within the rail sections 68 of the front water-craft section 42.

Referring to FIGS. 6 to 8, there are provided means to vertically adjust the level of the two water-craft sections with respect to the vehicle 10, and this independently of each other, so that proper buoyancy of the vehicle 10 can be obtained in accordance with load distribution on the vehicle 10. As shown in these figures, the front and rear legs 30 and 34, respectively, of the rails 26 are secured to the front and rear brackets 32, 36, respectively, through the intermediary of front and back mounting plates 84 and 86, respectively. Each of these plates carries near the upper end thereof a pair of apertured ears 88 supporting a sleeve 90 which has diametrically-opposite studs 92 removably inserted within the apertures of gears 88. The untreaded upper portion of a treaded rod 94 is rotatably inserted within sleeve 90. However, this rod cannot move axially with respect to sleeve 90. Threaded rod 94 can be rotated by means of a suitable tool inserted through the slots 96 of a U-shaped operating member 98 secured to the top end of threaded rod 94. Similarly, the mounting frames 66 and 76 of the bow and stern water-craft sections, respectivley, are provided with a pair of apertured ears 100 carrying an inwardly-threaded bushing 102, which has opposite studs 104 removably inserted within the apertures of the ears 100. As shown in FIG. 8, the bushing 102 can be released from the ears 100 by spreading said ears apart to disengage the studs 104. Bushing 102 is screwed on threaded rod 94. It will thus be understood that by rotating the respective threaded rods 94 in one direction or the other, the bow and stern water-craft sections 42, 44 can be independently raised or lowered with respect to the vehicle 10, in order to adjust the floatation level of each water-craft section.

The adjustment means are located along the centerline of the assembled vehicle and water-craft sections, as clearly shown in FIGS. 2, 4, and 5. It will be understood that in order to store the two water-craft sections into their inoperative position, the ears 100 must be released from the studs 104 of the bushing 102, both at the front and back of the vehicle. The same applies when it is desired to completely remove the watercraft section from the rails 26 to either store the same or to couple them directly to each other.

Referring to FIG. 2, it is clear that the watercraft sections, when coupled together, can serve as an ordinary water-craft, except for the central transverse partition provided by the rear wall 50 of the bow watercraft section 42 and the front wall 56 of the stern watercraft section 44.

If it is desired to prevent relative up-and-down movement of the two water-craft sections, the apertured ears 100 can be connected through a suitable pin inserted through their apertures.

Referring to FIG. 2, it is seen that the buoyant members 42, 44 need be about the same width as that of the motor vehicle. Therefore, in their raised inoperative position, they will not constitute an obstruction when the vehicle travels along a narrow path. In their inoperative position, these water-craft sections serve to a certain extent as a shelter against the weather elements for the vehicle passengers.

Also, in their inoperative position, the overall length of the vehicle is practically the same as a vehicle without the water-craft sections.

Locking means, not shown, are provided to lock the two water-craft sections in their stored, inoperative positions.

A water-repellant canvas may be added to cover the buoyant members. The canvas is removable and adjustable by use of snaps. The canvas, when covering the buoyant members, protects any baggage that may be stored in the buoyant members when in their operative position.

What I claim is:

1. A floatation assembly to render an off-road vehicle amphibious, said vehicle having a vehicle frame and wheels, said assembly comprising a pair of spaced rails, each of inverted U-shape defining front and rear legs, and a bight portion, said front and rear legs adapted to be secured to the front and rear of said vehicle frame with the bight portion of each rail above a vehicle driver seated in said vehicle, front and back floatation members two pairs of vertically-spaced hook members carried by each floatation member and releasably hooked onto said rails and displaceable therealong, the lower hook members of said pairs, when released from said rails, permitting upward pivoting of the floatation member relative to said rails about the uper hook members of said pairs, whereby both floatation members are shiftable relative to said rails between an operative position, to permit the vehicle to be water borne, and an inoperative position to permit the vehicle to travel on the ground, said floatation members, when in operative position, extending forwardly and rearwardly of the vehicle, repectively, at the level of said vehicle, and when in inoperative position, said front floatation member is supported on the bight portions of both rails and said rear floatation member is pivoted upwardly against said rear legs.

2. A floatation assembly as defined in claim 1, wherein said hook members are idle rollers and said rails have a C-shaped cross-section to receive said rollers.

3. A floatation assembly as defined in claim 1, further including level adjustment members interconnecting said front and back floatation members to the front and back of the vehicle frame, repectively, said level adjustment members being operable independently of one another to independently adjust the level of each floatation member relative to said vehicle, when said floatation members are in their operative position.

4. A floatation assembly as defined in claim 3, wherein each level adjustment member includes a threaded rod vertically carried by said rails intermediate the front legs and intermediate the rear legs, respectively, and a threaded bushing carried by the back of said front floatation member and by the front of said rear floatation member, respectively, and each threaded on one of said threaded rods and further including means to release said bushings from the respective floatation members.

5. A floatation assembly as defined in claim 1, wherein each floatation member is a water-craft section, being hollow and open at the top to receive passengers.

6. A floatation assembly as defined in claim 1, wherein each floatation member is a water-craft section, being hollow and open at the top to receive passengers, and wherein one of said water-craft sections is provided with rail sections to receive the hook members of the other water-craft section, so as to directly couple both water-craft sections.

* * * * *